(12) United States Patent
Baum et al.

(10) Patent No.: US 9,247,372 B2
(45) Date of Patent: Jan. 26, 2016

(54) WIRELESS MOBILE DEVICE NETWORK APPLICATION PROXY WITH EXCHANGE SEQUENCE GENERATOR

(71) Applicant: TEXAS INSTRUMENTS INCORPORATED, Dallas, TX (US)

(72) Inventors: Avi Baum, Giva't Shmuel (IL); Eliad Adi Klein, Sunnyvale, CA (US); Artur Zaks, Modiin (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 385 days.

(21) Appl. No.: 13/650,679

(22) Filed: Oct. 12, 2012

(65) Prior Publication Data

US 2013/0191532 A1   Jul. 25, 2013

Related U.S. Application Data

(60) Provisional application No. 61/589,506, filed on Jan. 23, 2012.

(51) Int. Cl.
  *G06F 15/173*  (2006.01)
  *H04W 4/00*  (2009.01)
  *H04W 4/20*  (2009.01)

(52) U.S. Cl.
  CPC .............. *H04W 4/001* (2013.01); *H04W 4/20* (2013.01)

(58) Field of Classification Search
  CPC ................... H04W 4/001; H04W 4/20

USPC .......................................................... 709/224
See application file for complete search history.

(56) References Cited

U.S. PATENT DOCUMENTS

| | | | |
|---|---|---|---|
| 7,961,756 B1* | 6/2011 | Lambert | G06F 1/3215 370/469 |
| 2006/0259623 A1 | 11/2006 | Crawford et al. | |
| 2009/0135751 A1* | 5/2009 | Hodges | G06F 1/3209 370/311 |
| 2010/0070642 A1 | 3/2010 | Bansal et al. | |
| 2010/0125742 A1 | 5/2010 | Ohtani | |
| 2010/0174808 A1 | 7/2010 | Dabagh et al. | |
| 2010/0208724 A1 | 8/2010 | Booth | |
| 2011/0029659 A1* | 2/2011 | Shah | H04L 12/12 709/224 |
| 2011/0138210 A1 | 6/2011 | Belali | |
| 2012/0173901 A1* | 7/2012 | Soliman | H04W 88/182 713/320 |

* cited by examiner

*Primary Examiner* — Jude Jean Gilles
*Assistant Examiner* — Jaren M Means
(74) *Attorney, Agent, or Firm* — Lawrence J. Bassuk; Frank D. Cimino

(57) ABSTRACT

Systems and methods disclosed herein receive a network application proxy (NAP)-extended API function call issued by a networking-aware host application. The NAP-extended API function call provides parameter values associated with a host off-loadable packet exchange sequence. Using the parameter values, a NAP module intercepts and responds to one or more incoming network packets associated with the host off-loadable packet exchange sequence while the host processor is in a sleep mode state or is transitioning between sleep mode states.

6 Claims, 4 Drawing Sheets

WIRELESS MOBILE DEVICE NETWORK APPLICATION PROXY WITH EXCHANGE SEQUENCE GENERATOR

PRIORITY CLAIM

This application claims the benefit of priority under 35 U.S.C. §119(e) to U.S. Provisional Patent Application Ser. No. 61/589,506 titled "Network Application Proxy," filed on Jan. 23, 2012 and incorporated herein by reference in its entirety.

TECHNICAL FIELD

Embodiments described herein relate to wireless mobile devices, including systems and methods associated with off-loading network communication functions to enable deeper and/or longer host processor sleep mode periods.

BACKGROUND INFORMATION

A proliferation of wireless mobile devices and increasing network availability have contributed to a growing demand for "always available" network applications. Such applications, including but not limited to voice over Internet protocol (VOIP), instant messaging, service discovery, and server applications, may be remotely triggered. That is, an "always available" application running in the wireless mobile device may be required to continue execution indefinitely while waiting for a trigger message from an incoming VOIP call, etc.

The term "wireless mobile device" as used herein means a portable communication and/or computing device employing a portable power source such as batteries, solar cells, etc. and including a radio for wireless data communications. Such devices include data-capable cellular telephones, wireless laptop computers, tablet computers, portable wireless games, etc.

Today's wireless mobile devices typically execute user applications using one or more main ("host") processors. The host processor typically consumes large amounts of power such that host processor activity becomes the limiting factor for wireless mobile device battery runtime. Various schemes have evolved for extending battery runtime, including the evolution of low-power semiconductor devices. One of the most significant battery power-saving techniques is that of "sleep mode operation." A wireless mobile device enters sleep mode by disabling all or portions of host processor functionality for slices of time during which applications do not require the disabled processor cycles. A host processor is said to enter increasingly "deeper" levels of sleep mode operation as power to the processor is increasingly disabled.

An active application may be allocated slower cycles or no cycles at all while the processor sleeps. Also, sleep mode operation often requires overhead cycles to save pointers, register values, etc. prior to disabling the processor and to retrieve those values upon restarting the processor. Thus, sleep mode operation may result in increased application startup latency and/or run latency for applications executing at the time of entering sleep mode. From a user perspective, battery runtime may be perceived as longer in a more sluggish wireless mobile device and shorter in a snappier device. Careful programming trade-offs may help to optimize performance versus runtime.

Remotely triggered network applications, such as those mentioned above, tend to be latency-sensitive. For example, the ring signal associated with an incoming VOIP call may be delayed while a sleeping processor is powered up, retrieves context, and resumes handling the network stack. Network application programmers may, in some cases, disallow deep levels of sleep mode operation in order to ensure acceptable performance of an application across multiple wireless mobile device platforms. As a consequence, battery drain may be excessive while such applications are simply executing wait states for periods that could last for minutes, hours, or more while waiting for an incoming VOIP call, instant message, etc. In other cases, the wireless networking device may be configured to wake up the host processor upon receipt of any packet, potentially resulting in frequently interrupted sleep states.

SUMMARY OF THE INVENTION

Systems and methods described herein offload host processor network communication sequences to a networking device processor. Incoming network application packets are filtered and responded to while waking up the host processor. Doing so provides time to waken the host processor upon receipt of an incoming network application trigger packet while providing acceptable network latency. Deeper and/or longer host processor sleep states may result.

DETAILED DESCRIPTION

Figure 1:
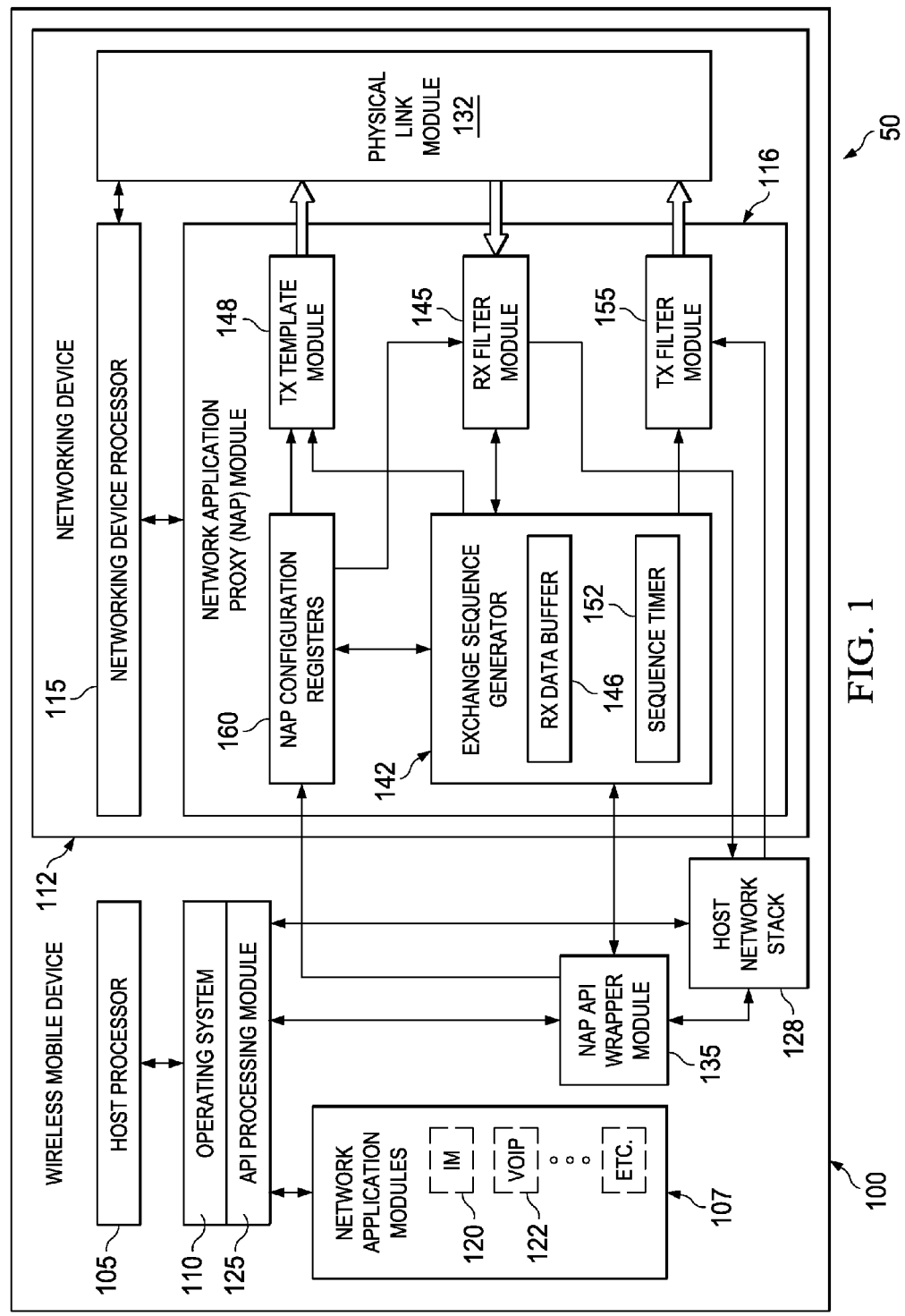
FIG. 1 is a block diagram of network application proxy system in a wireless mobile device 100 according to various example embodiments of the invention.

FIG. 1 is a block diagram of network application proxy (NAP) system 50 in a wireless mobile device 100 according to various example embodiments of the invention. The NAP system 50 includes a host processor 105 executing one or more network application modules 107. The NAP system 50 also includes an operating system (OS) 110 communicatively coupled to the host processor 105. The NAP system 50 further includes a networking device 112 communicatively coupled to the host processor 105. In some embodiments, the networking device 112 may be implemented as a wireless networking module. In some embodiments, the networking device 112 may be included as a sub-element of the host processor 105. The networking device 112 handles network packet assembly, transmission, reception, and disassembly.

The networking device 112 includes a networking device processor 115. The networking device processor 115 provide processing cycles to the networking device 112 independent from processing cycles associated with the host processor 105. A NAP module 116 intercepts and responds to incoming network packets associated with a host off-loadable packet exchange sequence, as further described below. The NAP module 116 so intervenes while the host processor 105 is in a sleep mode state or is transitioning between sleep mode states.

The NAP system 50 includes one or more network application modules 107, as previously mentioned. In the context of this disclosure, "network application" means a set of activities executable by a processor to include receiving data transferred via wireless communication packets and/or providing data to be transferred via wireless communication packets. Examples of network applications include instant messaging applications 120 and VOIP applications 122.

Operating within the NAP system 50 context, a network application module 107 issues one or more NAP-extended network API function calls. Such NAP network API call configures the NAP system 50 to handle a host off-loadable packet exchange sequence as follows. An API processing module 125 associated with the OS 110 intercepts various types of API calls, including the NAP-extended network API call issued by the application 107.

A host network stack 128 is communicatively coupled to the API processing module 125 to communicate with network application modules 107 via non NAP-extended network API function calls. The NAP system 50 also includes a physical link module 132 communicatively coupled to the host network stack 128. The physical link module 132 receives inbound packets at the wireless mobile device 100 and transmits packets outbound from the wireless mobile device 100.

The NAP system 50 also includes a NAP API wrapper module 135 communicatively coupled to the API processing module 125. The API processing module 125 passes the NAP-extended network API call to the NAP API wrapper module 135. The NAP API wrapper module 135 receives the NAP-extended API function call and issues a NAP wrapper function call to a NAP module 116 in response.

The NAP module 116 is a component of the networking device 112, as previously mentioned. An exchange sequence generator 142 component of the NAP module 116 configures a receive filter, enables a transmit filter, receives one or more incoming packets associated with the host off-loadable packet exchange sequence, selects a transmit template applicable to the host off-loadable packet exchange sequence, populates fields of one or more transmit packets conforming to the transmit template and generated in response to an incoming packet, and issues a host wake-up command associated with the end of the host off-loadable packet exchange sequence.

The exchange sequence generator 142 includes a receive data buffer 146. The receive data buffer 146 stores data fields associated with incoming packets to forward to the host network stack 128 upon completion of the host off-loadable packet exchange sequence. The exchange sequence generator 142 also includes a sequence timer 152. The sequence timer 152 determines when to send each transmit packet and when to issue a host wake-up command.

The NAP module 116 further includes a receive filter module 145 communicatively coupled to the exchange sequence generator 142. The receive filter module 145 determines whether an incoming packet is associated with a host off-loadable packet exchange sequence. If so, the receive filter module 145 passes the incoming packet to the exchange sequence generator 142. The receive filter module 145 passes packets not associated with a host off-loadable packet exchange sequence through the NAP module 116 and to the host network stack 128.

The NAP system 50 also includes a transmit template module 148 communicatively coupled to the exchange sequence generator 142. The transmit template module 148 stores a set of transmit templates selectable by the exchange sequence generator 142. The transmit template module 148 assembles the transmit packet using field data supplied by the exchange sequence generator 142. The transmit template module 148 then sends the transmit packet to the physical link module 132 for outbound transmission.

The NAP system 50 further includes a transmit filter module 155 communicatively coupled to the exchange sequence generator 142. The transmit filter module 155 passes outbound packets to the physical link 132 for outbound transmission when NAP functionality is not invoked. The transmit filter module 155 blocks outbound packets when NAP functionality is invoked.

The NAP system 50 also includes NAP configuration registers 160 communicatively coupled to the exchange sequence generator 142. The NAP configuration registers 160 load exchange sequence generator parameters at NAP initialization. In some embodiments, the NAP configuration registers 160 are communicatively coupled to the transmit template module 148 to load sets of transmit templates at NAP initialization. In some embodiments, the NAP configuration registers 160 are communicatively coupled to the receive filter module 145 to load receive filters at NAP initialization.

Figure 2:
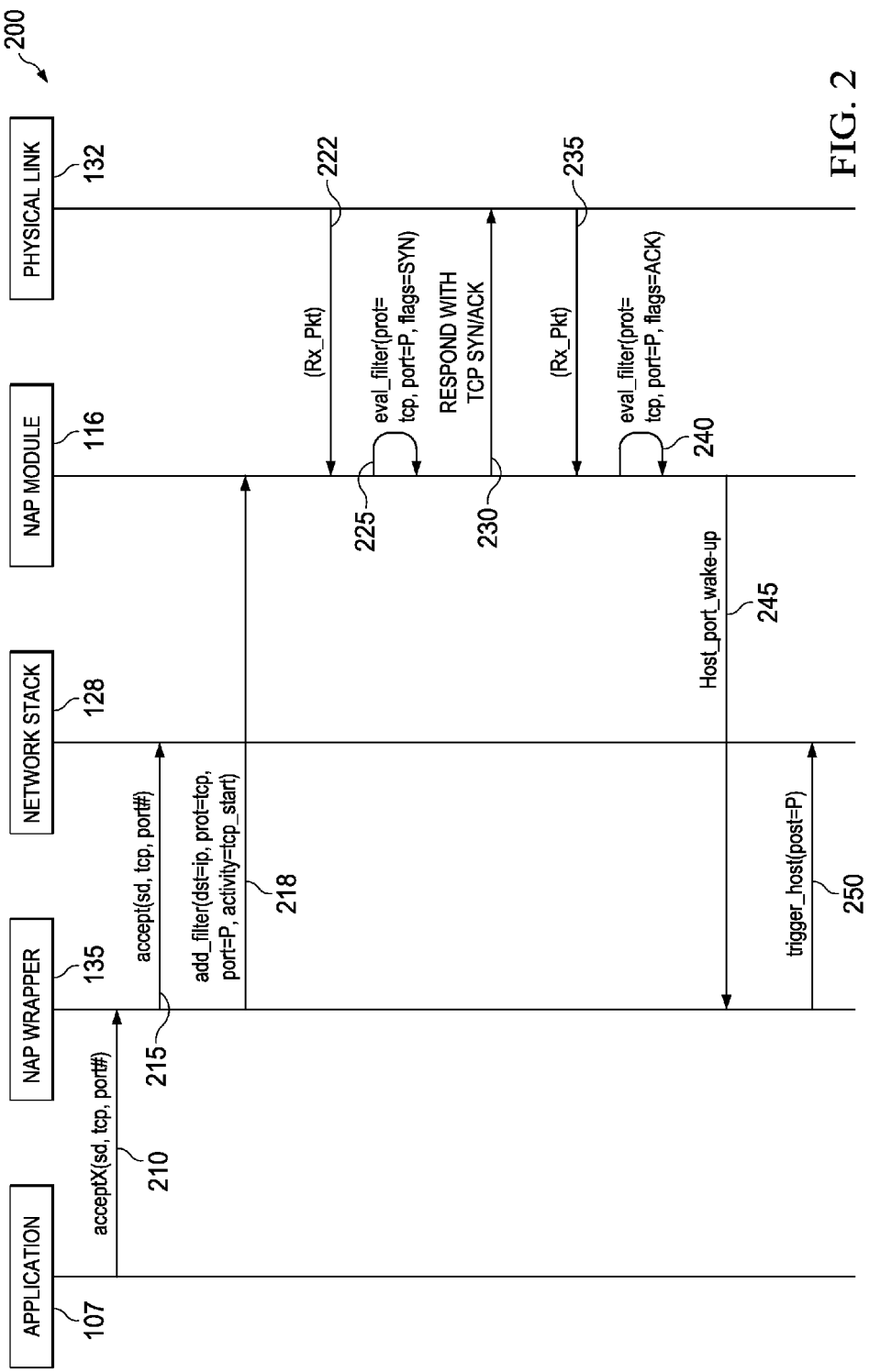
FIG. 2 is a sequence diagram illustrating a typical interprocess communication sequence associated with a network application proxy system according to various example embodiments.

FIG. 2 is a sequence diagram illustrating a typical interprocess communication sequence 200 associated with the NAP system 50 of FIG. 1 according to various example embodiments. Communication points include an application module 107, the NAP API wrapper module 135, the host network stack 128, the NAP module 116, and the physical link module 132 as previously described. Message syntax is shown in the sequence 200 for purposes of example, and may vary according to particular implementations of various embodiments.

A network application module 107 may be NAP-aware and may wish to allow the host processor to enter a sleep state pending receipt of an incoming network packet. The network application module 107 initiates the sequence by sending a NAP-extended network API function call 210 to the NAP API wrapper module 135. The NAP module 135 informs the host network stack 128 of the activity by sending an analogue, non NAP-extended API function call 215. The NAP module 135 also sends a NAP API wrapper function call 218 to the NAP module 116.

The NAP API wrapper function call 218 establishes a wait state at the NAP module 116 as appropriate to the API function call 210 issued by the application module 107. In particular, the NAP wrapper function call 218 invokes one or more receive filters (e.g., the receive filters 225 and 240) at the NAP module 116. The receive filters identify incoming packets associated with the network application module 107. The receive filters may identify incoming packets based upon parameters such as protocol type, port number, etc.

For purposes of this example, let us suppose that the API function call 210 issued by the application module 107 specifies a common TCP SYN—SYN/ACK—ACK host off-loadable packet exchange sequence. A packet 222 received at the NAP module 116 from the physical link module 132 is evaluated by the receive filter 225. Let us suppose that the packet 222 is identified by the receive filter 225 as a SYN packet corresponding to the TCP protocol and matching the port number specified by the API function call 210 and by the NAP API wrapper function call 218. The NAP module 116 may then respond with an outbound, port-matched SYN/ACK packet 230, thereby emulating the behavior of the currently-sleeping host network stack 128. A port-matched TCP ACK packet 235 may be subsequently received and evaluated by the receive filter 240.

At an appropriate time during the host off-loadable packet exchange sequence, the NAP module 116 issues a host wake-up message 245. In some embodiments, the host wake-up message 245 may traverse the NAP wrapper module 135. The NAP wrapper module 135 may subsequently wake up the host processor and reactivate the host network stack 128 as shown by the trigger_host message 250.

Figure 3A:
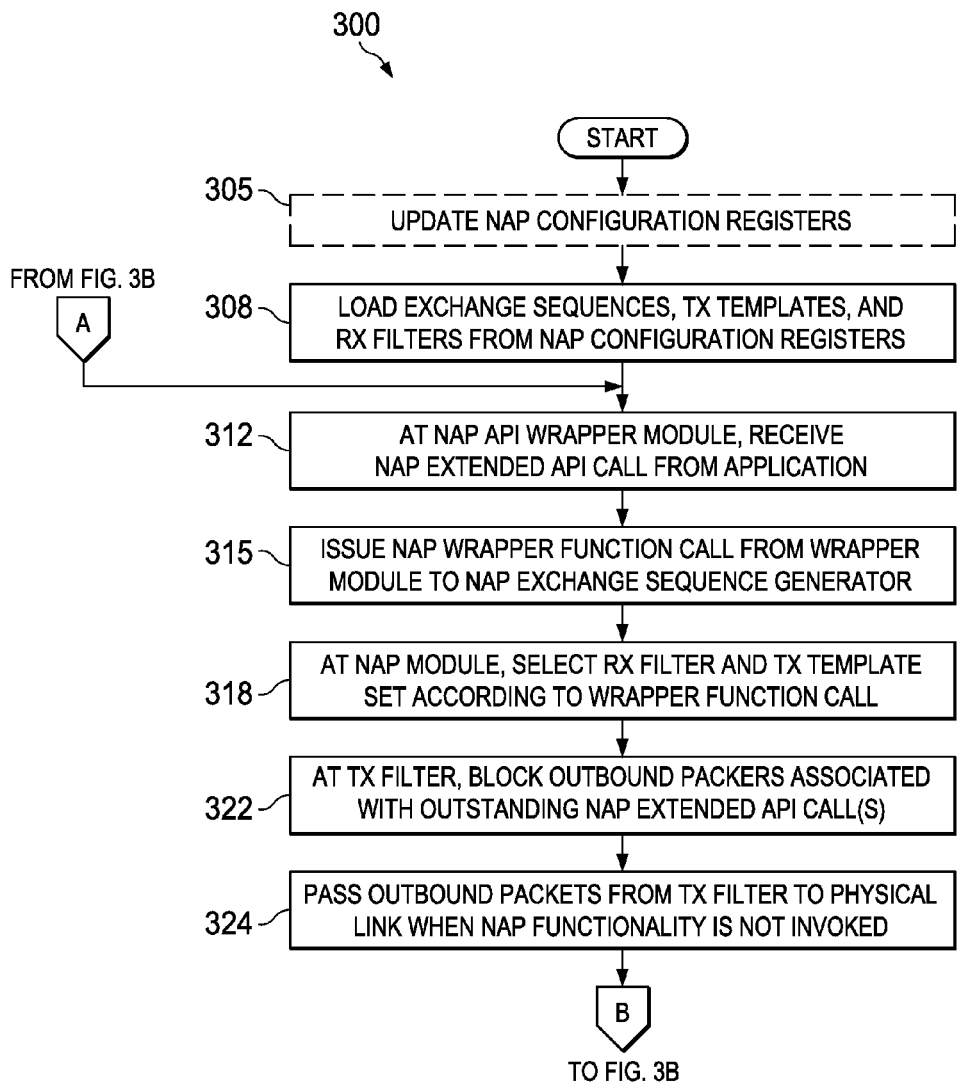
FIGS. 3A and 3B are a flow diagram associated with a method of extending sleep states in a wireless mobile device according to various example sequences.
Figure 3B:
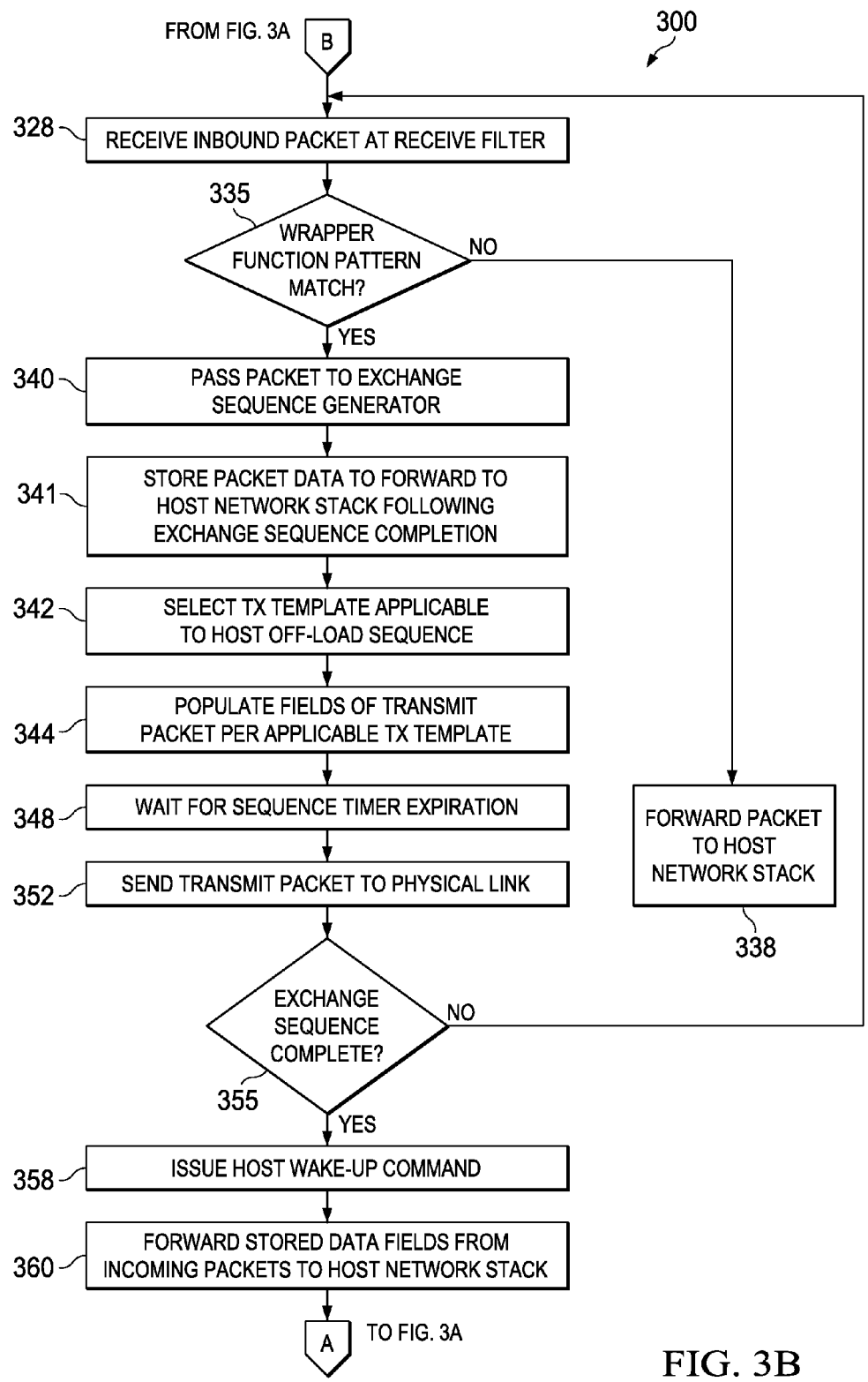

FIGS. 3A and 3B are a flow diagram associated with a method 300 of extending sleep states in a wireless mobile device according to various example sequences. The method 300 includes intercepting and responding to one or more incoming network packets associated with a host off-loadable packet exchange sequence while the host processor is in a sleep mode state or is transitioning between sleep mode states.

The method 300 may optionally commence at block 305 and with updating a set of NAP configuration registers (e.g., the configuration registers 160 of FIG. 1). The method 300 continues at block 308 with performing a sequence of NAP initialization activities, including loading exchange sequence generator parameters, loading sets of transmit templates, and loading receive filters.

The method 300 includes receiving a NAP-extended API function call at a NAP API wrapper module, at block 312. The NAP-extended API function call is issued by a networking-aware host application and is associated with the host off-loadable packet exchange sequence. The method 300 also includes issuing a NAP wrapper function call at the NAP API wrapper module in response to the NAP-extended API function call, at block 315. Both the NAP-extended API function call and the NAP wrapper function call encapsulate receive filter parameter values, as previously described. The receive filter parameter values are used to configure one or more receive filters to recognize incoming packets associated with a host off-loadable exchange sequence anticipated by the host network application.

The method 300 further includes configuring one or more receive filters and selecting a transmit template filter set according to parameters associated with the NAP wrapper function call, at block 318. The method 300 also includes blocking outbound packets associated with outstanding NAP extended API calls, at block 322. The method 300 further includes passing outbound packets from the transmit filter to a physical link for outbound transmission when NAP functionality is not invoked, at block 324.

The method 300 continues at block 328 with receiving an incoming packet at the receive filter. The method 300 includes determining whether the packet is associated with the host off-loadable packet exchange sequence, at block 335. If not, the method 300 includes forwarding the packet to the host network stack, at block 338.

If the receive filter determines a pattern match, the method 300 proceeds at block 340 with passing the incoming packet to an exchange sequence generator. The exchange generator is responsible for orchestrating a response to the incoming packet. When applicable, the method 300 includes storing packet data from the incoming packet to forward to the host network stack following completion of the host off-loadable packet exchange sequence, at block 341.

The method 300 also includes selecting a transmit template applicable to the host off-loadable packet exchange sequence, at block 342. The method 300 further includes populating fields of one or more transmit packets conforming to the transmit template, at block 344. The transmit packets are assembled using field data supplied by the exchange sequence generator.

In some implementations, the method 300 may also include waiting a sequence timer expiration period, at block 348, prior to sending the transmit packets to the physical link for outbound transmission, at block 352. Doing so may enable better control over sequence timing relative to latency involved with host processor wake-up.

The method 300 continues at block 355 with determining whether the exchange sequence has completed, per the applicable exchange sequence pattern known to the exchange sequence generator. If not, the method 300 includes waiting for and receiving additional inbound packet at the receive filter, at block 328. If the exchange sequence has completed, the method 300 includes issuing a host wake-up command, at block 358. It is noted that some implementations of the method 300 may initiate host wake-up prior to completion of the exchange sequence in order to take into account latency associated with the host wake-up process.

The method 300 may terminate with forwarding any stored data fields associated with incoming packets to the host network stack following completion of the host off-loadable packet exchange sequence, at block 360. The method 300 may begin anew by receiving another NAP extended API call from a network application, at FIG. 3A, block 312.

Modules and components described herein may include hardware circuitry, optical components, single or multi-processor circuits, and/or memory circuits. Disclosed modules and components may also include computer-readable media with computer instructions encoded therein/thereon capable of being executed by a processor, including non-volatile memory with firmware stored therein, but excluding non-functional descriptive matter. Subject matter of the instant disclosure may also include combinations of described modules and components, as desired by the architects of the NAP system 50 and the method 300 and as appropriate for particular implementations of various embodiments.

Systems and methods described herein may be useful in applications other than extending sleep mode operation in a wireless mobile device. Examples of the NAP system 50 and the method 300 are intended to provide a general understanding of the structures of various embodiments and the flow of various sequences. They are not intended to serve as complete descriptions of all elements and features of systems that might make use of these structures and sequences.

The various embodiments may be incorporated into electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

Systems and methods described herein offload host processor network communication sequences to a networking device processor. Doing so provides time to waken the host processor upon receipt of an incoming application trigger packet while providing acceptable network latency. Deeper and/or longer host processor sleep states may result.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A wireless mobile device comprising: A. host processor circuitry including operating system circuitry; B. an application processing circuit module coupled with the host processor circuitry; C. network application circuit modules coupled with the application processing circuit module; D. a wrapper circuit module coupled with the application processing circuit module; E. host network stack circuitry coupled with the wrapper circuit module and the application processing circuit module; F. a physical link circuit module having a receive output and a transmit input; and G. a network application proxy circuit module including: i. a receive circuit module having a receive input coupled with the receive output, a first output coupled with the host network stack circuitry, and a second output; ii. a transmit circuit module having a first input coupled with the host network stack circuitry, a second input, and a transmit output coupled with the transmit input; and iii. exchange sequence generator circuitry separate from the host processor circuitry and having a receive input coupled with the second output, a transmit output coupled with the second input, and being coupled with the wrapper circuit module.

2. The device of claim 1 in which the circuit modules include a circuit module for instant messaging.

3. The device of claim 1 in which the circuit modules include a circuit module for VOIP.

4. The device of claim 1 in which the receive circuit module is a receive filter circuit module.

5. The device of claim 1 in which the transmit circuit module is a transmit filter circuit module.

6. The device of claim 1 in which the exchange sequence generator circuitry includes a receive buffer having an input coupled to the second output and including a sequence timer coupled to the receive buffer.

* * * * *